US 8,447,880 B2

(12) United States Patent
Johnson et al.

(10) Patent No.: US 8,447,880 B2
(45) Date of Patent: May 21, 2013

(54) NETWORK STACK INSTANCE ARCHITECTURE WITH SELECTION OF TRANSPORT LAYERS

(75) Inventors: Darrin P. Johnson, Mountain View, CA (US); Erik Nordmark, Mountain View, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 796 days.

(21) Appl. No.: 11/642,490

(22) Filed: Dec. 20, 2006

(65) Prior Publication Data

US 2008/0151779 A1 Jun. 26, 2008

(51) Int. Cl.
*G06F 15/173* (2006.01)
(52) U.S. Cl.
USPC ............................ 709/238; 709/220; 370/419
(58) Field of Classification Search
USPC ......... 709/220, 227–230; 340/825.01–825.04
See application file for complete search history.

(56) References Cited

U.S. PATENT DOCUMENTS

| | | | |
|---|---|---|---|
| 5,485,460 A * | 1/1996 | Schrier et al. | 709/227 |
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,725 B1 * | 6/2004 | Frantz et al. | 709/223 |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,733,890 B1 * | 6/2010 | Droux et al. | 370/412 |
| 7,830,882 B2 * | 11/2010 | Johnson | 370/392 |
| 2003/0037154 A1 | 2/2003 | Poggio et al. | |
| 2004/0267866 A1 | 12/2004 | Carollo et al. | |
| 2005/0007958 A1 * | 1/2005 | Auerbach | 370/241 |
| 2005/0111455 A1 | 5/2005 | Nozue et al. | |
| 2005/0120160 A1 * | 6/2005 | Plouffe et al. | 711/1 |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2008/0089338 A1 * | 4/2008 | Campbell et al. | 370/392 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Greg C Bengzon
(74) *Attorney, Agent, or Firm* — Osha Liang LLP

(57) ABSTRACT

A method for configuring a network on a host includes obtaining a first virtual network stack and a second virtual network stack on the host, configuring a first transport layer implementation on the first virtual network stack, configuring a second transport layer implementation on the second virtual network stack, receiving a packet by the host, sending a packet to the first virtual network stack, and processing the packet using the first transport layer implementation.

11 Claims, 3 Drawing Sheets

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

NETWORK STACK INSTANCE ARCHITECTURE WITH SELECTION OF TRANSPORT LAYERS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; SUN050589); "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. application Ser. No. 11/605,114 and "Method and System for Creating A Demilitarized Zone using Network Stack Instances" with U.S. application Ser. No. 11/642,427.

The present application contains subject matter that may be related to the subject matter in the following U.S. application entitled "Method and System for Virtual Routing using Containers" with U.S. application Ser. No. 11/642,756.

BACKGROUND

Network traffic is transmitted over a network, such as the Internet, from a sending computer system, via a first network interface card (NIC), to a receiving computer system via a second NIC. The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically transmitted through one or more connections. The connections may occur on a physical level. For example, the packets may be transmitted as signals (e.g., electrical, optical, etc) between the two systems through a variety of cables, routers, transmitters, receivers, and/or other interconnected hardware. In addition, the connections may occur on a logical level. For example, in order for the sending system and receiving system to communicate with one another, packets must properly reach the receiving system from the sending system. The receiving device must also recognize that the packets received are indeed meant for the receiving device and separate the packets from other incoming signals. Networking protocols dictate the rules for data representation, signaling, transfer, authentication, and error detection required to transmit information between the sending system and receiving system.

The Open Systems Interconnection Reference Model (OSI model) describes seven different layers that define requirements for communications between two computer systems. The OSI model was developed to enable interoperability between platforms offered by various vendors. Each layer of the OSI model performs services for the layer above and requests services from the layer below. In order from lowest to highest, the layers of the OSI model are: (i) the physical layer, which defines the electrical and physical specifications for devices, (ii) the data link layer, which specifies the transfer of data between network entities, (iii) the network layer, which describes the transmission of variable length data sequences from a source to a destination via one or more networks, (iv) the transport layer, which transfers data between end users, (v) the session layer, which opens, maintains, and closes connections between network devices, (vi) the presentation layer, which transforms data into a form usable by an application, and finally, (vii) the application layer, which allows a user to access the information transmitted over the network.

SUMMARY

In general, in one aspect, the invention relates to a method for configuring a network on a host, comprising obtaining a first virtual network stack and a second virtual network stack on the host, configuring a first transport layer implementation on the first virtual network stack, configuring a second transport layer implementation on the second virtual network stack, receiving a packet by the host, sending a packet to the first virtual network stack, and processing the packet using the first transport layer implementation.

In general, in one aspect, the invention relates to a system for configuring a network on a host, comprising the host, comprising a first virtual network stack, and a second virtual network stack, wherein the host is configured to obtain the first virtual network stack and the second virtual network stack, configure a first transport layer implementation on the first virtual network stack, configure a second transport layer implementation on the second virtual network stack, receive a packet, send the packet to the first virtual network stack, and process the packet using the first transport layer implementation.

In general, in one aspect, the invention relates to a computer usable medium having computer readable program code embodied therein for causing a computer system to execute a method for configuring a network on a host, the method comprising obtaining a first virtual network stack and a second virtual network stack on the host, configuring a first transport layer implementation on the first virtual network stack, configuring a second transport layer implementation on the second virtual network stack, receiving a packet by the host, sending a packet to the first virtual network stack, and processing the packet using the first transport layer implementation.

Other aspects of the invention will be apparent from the following description and the appended claims.

DETAILED DESCRIPTION

Figure 1:
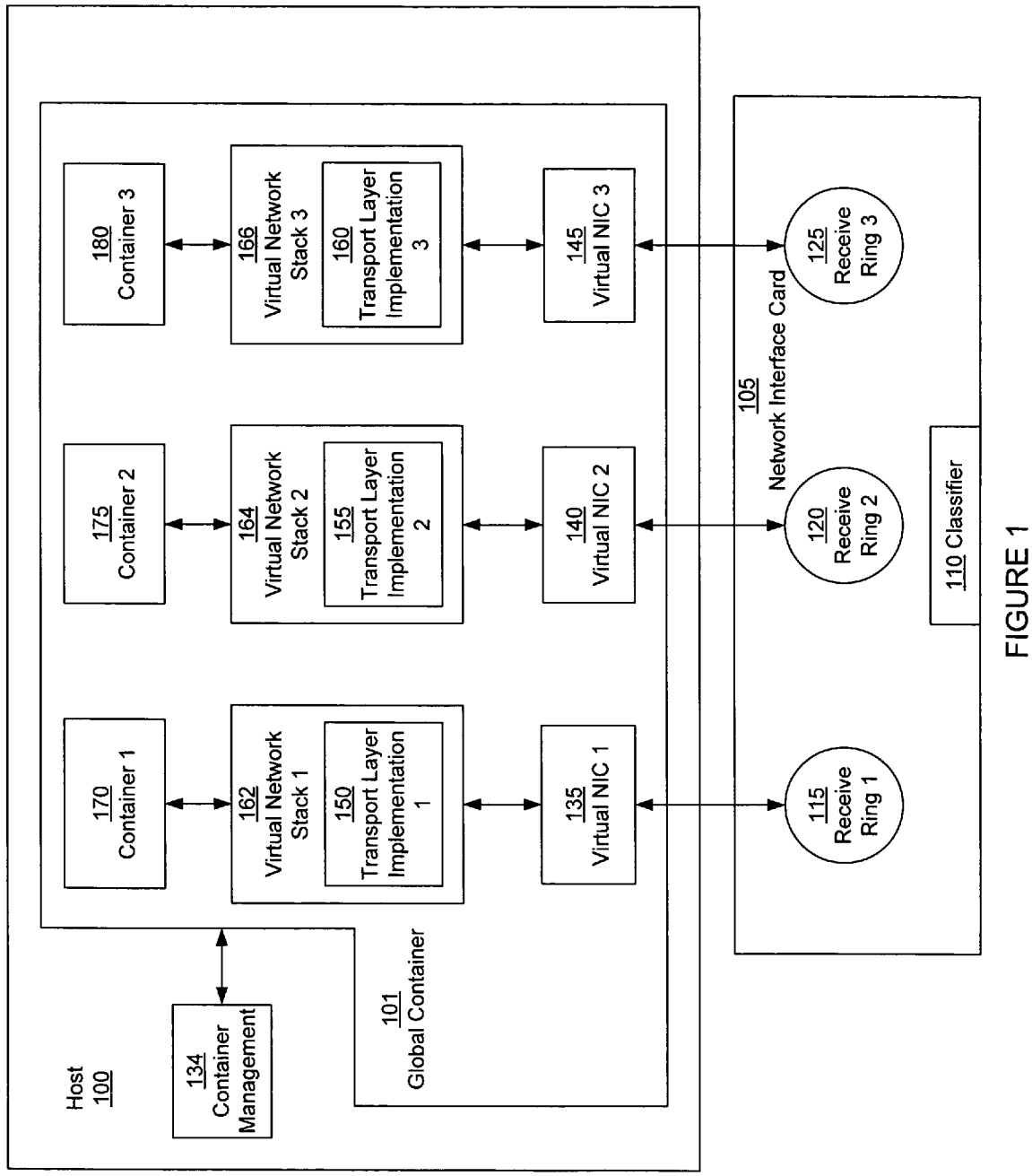
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to select a transport layer implementation for a virtual network stack. In one embodiment of the invention, a virtual network stack corresponds to a software network stack with network layer and transport layer functionality. In one embodiment of the invention, a transport layer implementation for a virtual network stack specifies a set of tunables for the virtual network stack including, but not limited to, the transport protocol, transport protocol version, congestion control algorithm, congestion control parameters, etc. Further, embodiments of the invention allow different transport layer implementations to be tested separately and concurrently on the same host before deployment. In addition, embodiments of the invention enable switching of transport layer implementations on a virtual network stack with minimal downtime involved in the switch.

FIG. 1 shows a schematic diagram of a system in accordance with one or more embodiments of the invention. As shown in FIG. 1, the system includes a host (100), a NIC (105), multiple virtual NICs (e.g., virtual NIC 1 (135), virtual NIC 2 (140), virtual NIC 3 (145)), multiple virtual network stacks (e.g., virtual network stack 1 (162), virtual network stack 2 (164), virtual network stack 3 (166)), and multiple containers (e.g., global container (101), container 1 (170), container 2 (175), container 3 (180)). Each of these components is described below.

In one embodiment of the invention, the NIC (105) provides an interface between the host (100) and a network (not shown) (e.g., a local area network, a wide area network, an ad hoc network, a wireless network, etc.). More specifically, the NIC (105) includes a network interface (NI) (i.e., the hardware on the NIC used to interface with the network). For example, the NI may correspond to an RJ-45 connector, a wireless antenna, etc. The packets received by the NI are then forwarded to other components on the NIC (105) for processing. In one embodiment of the invention, the NIC (105)

includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. Further, in one embodiment of the invention, a ring element of the receive rings (e.g., receive ring 1 (115), receive ring 2 (120), receive ring 3 (125)) may point to a memory location in host memory (not shown). In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets should be forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. The classifier (110) may be implemented in hardware (i.e., the classifier (110) may be a separate microprocessor embedded on the NIC (105)), the classifier (110) may be implemented in software stored in memory (e.g., firmware, etc.) on the NIC and executed by a microprocessor on the NIC (105), or the classifier (110) may be implemented using a combination thereof.

In one or more embodiments of the invention, the host (100) may include a device driver (not shown) and one or more virtual NICs (e.g., virtual NIC 1 (135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (130), virtual NIC 2 (135), virtual NIC 3 (140)) receives incoming packets from the corresponding receive ring (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1(135), virtual NIC 2 (140), virtual NIC 3 (145)) and transmit rings (not shown) are implemented as ring buffers in either software or hardware.

In one or more embodiments of the invention, the virtual NICs (e.g., virtual NIC 1 (135), virtual NIC 2 (140), virtual NIC 3 (145)) are operatively connected to containers (e.g., container 1 (170), container 2 (175), container 3 (180)) via virtual network stacks (e.g., virtual network stack 1 (162), virtual network stack 2 (164), virtual network stack 3 (166)). The virtual NICs (e.g., virtual NIC 1 (135), virtual NIC 2 (140), virtual NIC 3 (145)) provide an abstraction layer between the NIC (105) and the containers (e.g., container 1 (170), container 2 (175), container 3 (180)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more IP addresses, one or more ports, and configured to handle one or more protocol types. Thus, while the host (100) may be operatively connected to a single NIC (105), containers (e.g., container 1 (170), container 2 (175), container 3 (180)), such as containers or applications, executing on the host (100) operate as if the host (100) is bound to multiple NICs.

In one embodiment of the invention, each virtual network stack (e.g., virtual network stack 1 (162), virtual network stack 2 (164), virtual network stack 3 (166)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack 1 (162), virtual network stack 2 (164), virtual network stack 3 (166)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack 1 (162), virtual network stack 2 (164), virtual network stack 3 (166)) implement a network layer (not shown) and a transport layer (e.g., transport layer implementation 1 (150), transport layer implementation 2 (155), transport layer implementation 3 (160)).

In one or more embodiments of the invention, the transport layer implementation (e.g., transport layer implementation 1 (150), transport layer implementation 2 (155), transport layer implementation 3 (160)) is individually specified for each virtual network stack (e.g., virtual network stack 1 (162), virtual network stack 2 (164), virtual network stack 3 (166)). In one or more embodiments of the invention, the virtual network stack (e.g., virtual network stack 1 (162), virtual network stack 2 (164), virtual network stack 3 (166)) is identified using a socket. A mapping of the socket to a transport layer implementation (e.g., transport layer implementation 1 (150), transport layer implementation 2 (155), transport layer implementation 3 (160)) provides the transport layer implementation for the virtual network stack (e.g., virtual network stack 1 (162), virtual network stack 2 (164), virtual network stack 3 (166)) with corresponding to that socket. If a desired transport layer implementation (e.g., transport layer implementation 1 (150), transport layer implementation 2 (155), transport layer implementation 3 (160)) does not exist, a new transport layer implementation is created to process network traffic between the container (e.g., container 1 (170), container 2 (175), container 3 (180)) and the network (not shown). The new transport layer implementation (e.g., transport layer implementation 1 (150), transport layer implementation 2 (155), transport layer implementation 3 (160)) is then mapped to the socket corresponding to the virtual network stack (e.g., virtual network stack 1 (162), virtual network stack 2 (164), virtual network stack 3 (166)), and the new transport layer implementation is then used by the virtual network stack to process network traffic.

In one or more embodiments of the invention, the transport layer implementation (e.g., transport layer implementation 1 (150), transport layer implementation 2 (155), transport layer implementation 3 (160)) includes a transport protocol, transport protocol version, congestion control algorithm, congestion control parameters, etc. In addition, the transport layer implementation (e.g., transport layer implementation 1 (150), transport layer implementation 2 (155), transport layer implementation 3 (160)) may contain one or more patches; the patches may be tested on a virtual network stack (e.g., virtual network stack 1 (162), virtual network stack 2 (164), virtual network stack 3 (166)) before releasing the patches to a production environment. Further, the transport layer implementation (e.g., transport layer implementation 1 (150), transport layer implementation 2 (155), transport layer implementation 3 (160)) may include a new or customized transport protocol version, which may be tested on the host (100) before migrating the transport layer implementation to other machines. In one or more embodiments of the invention, the virtual network stack (e.g., virtual network stack 1 (162), virtual network stack 2 (164), virtual network stack 3 (166)) is mapped to the transport layer implementation (e.g., transport layer implementation 1 (150), transport layer implementation 2 (155), transport layer implementation 3 (160)) by specifying an address family, socket type, protocol number, and/or transport provider driver.

For example, the Solaris™ (Solaris is a trademark of Sun Microsystems, Inc. of Santa Clara, Calif., USA) "sock2path" file may be edited to specify the transport layer implementation (e.g., transport layer implementation 1 (150), transport layer implementation 2 (155), transport layer implementation 3 (160)) for a virtual network stack (e.g., virtual network stack 1 (162), virtual network stack 2 (164), virtual network stack 3 (166)). By adding a line to the sock2path file with an address family, socket type, protocol number, and/or a transport provider device path, an administrator is able to select a transport layer implementation (e.g., transport layer implementation 1 (150), transport layer implementation 2 (155), transport layer implementation 3 (160)) denoted by the transport provider device path for the virtual network stack (e.g., virtual network stack 1 (162), virtual network stack 2 (164), virtual network stack 3 (166)) represented by the address family, socket type, and protocol number.

In one or more embodiments of the invention, the Solaris™ command "soconfig" is used to configure the transport layer implementation (e.g., transport layer implementation 1 (150), transport layer implementation 2 (155), transport layer implementation 3 (160)) for a given virtual network stack (e.g., virtual network stack 1 (162), virtual network stack 2 (164), virtual network stack 3 (166)). For example, inputting "soconfig 2 2 6/dev/tcp" at a Solaris™ command prompt will add a line to the sock2path file specifying the /dev/tcp transport layer implementation for the socket with address family 2, socket type 2, and protocol number 6. In addition, soconfig may be used to remove an existing mapping by leaving the path unspecified.

In one or more embodiments of the invention, the address family and socket type numbers are listed in a header file (e.g., /usr/include/sys/socket.h), and the protocol number is specified in an address family-specific include file. In one or more embodiments of the invention, an unspecified protocol number is denoted with the value zero, such that all virtual network stacks (e.g., virtual network stack 1 (162), virtual network stack 2 (164), virtual network stack 3 (166)) with a particular address family and socket type are assigned that particular transport layer implementation (e.g., transport layer implementation 1 (150), transport layer implementation 2 (155), transport layer implementation 3 (160)) by default (e.g., 2 2 0/dev/tcp), unless another line in the sock2path file lists another transport layer implementation with the given address family, socket type, and specific protocol number (e.g., 2 2 6/dev/udp).

As shown in FIG. 1, the host (100) includes a global container (101) and a number of non-global containers (e.g., container 1 (170), container 2 (175), container 3 (180)). The global container (101) corresponds to an isolated execution environment within the host (100). Further, each non-global container (e.g., container 1 (170), container 2 (175), container 3 (180)) corresponds to an isolated execution environment within the global container (101). All of the containers (global and non-global) share a common kernel, and as a result, execute the same operating system. While all of the containers share a common kernel, the non-global containers (e.g., container 1 (170), container 2 (175), container 3 (180)) are configured such that processes executing in a given non-global container are restricted to execute in the non-global container and have no access to resources not assigned to the non-global container. The isolated execution environments of each non-global container (e.g., container 1 (170), container 2 (175), container 3 (180)) as well as the global container (101) are managed by a container management component (134) executing on the host (100). The container management component (134) typically executes outside of the global container (101). An example of a container is a Solaris™ Container.

Each of the non-global containers (e.g., container 1 (170), container 2 (175), container 3 (180)) is configured to send and receive packets to and from the NIC (105). The virtual network stacks (e.g., virtual network stack 1 (162), virtual network stack 2 (164), virtual network stack 3 (166)) connected to the non-global containers (e.g., container 1 (170), container 2 (175), container 3 (180)) process outgoing packets before transmitting the packets to other containers or hosts; the virtual network stacks also process incoming packets from other sources before sending the packets to the containers. In one or more embodiments of the invention, each non-global container (e.g., container 1 (170), container 2 (175), container 3 (180)) and the global container (101) is identified by a container ID, which uniquely identifies the container in the host (100).

In one or more embodiments of the invention, a transport layer implementation (e.g., transport layer implementation 1 (150), transport layer implementation 2 (155), transport layer implementation 3 (160)) is specified for a virtual network stack (e.g., virtual network stack 1 (162), virtual network stack 2 (164), virtual network stack 3 (166)) by mapping the socket corresponding to the virtual network stack to a particular transport layer implementation. The transport layer implementation (e.g., transport layer implementation 1 (150), transport layer implementation 2 (155), transport layer implementation 3 (160)) is then incorporated into the virtual network stack (e.g., virtual network stack 1 (162), virtual network stack 2 (164), virtual network stack 3 (166)) by rebooting the container (e.g., container 1 (170), container 2 (175), container 3 (180)) governing the virtual network stack. Because a container (e.g., container 1 (170), container 2 (175), container 3 (180)) is an isolated execution environment, each container may be rebooted independently of the other containers, as well as the host operating system.

In one or more embodiments of the invention, rebooting a container (e.g., container 1 (170), container 2 (175), container 3 (180)) causes the kernel module(s) that implements the virtual network stacks (e.g., virtual network stack 1 (162), virtual network stack 2 (164), virtual network stack 3 (166)) to reload. In one or more embodiments of the invention, a virtual network stack (e.g., virtual network stack 1 (162), virtual network stack 2 (164), virtual network stack 3 (166)) implementation is associated with its own separate kernel module(s), such that each kernel module may be separately reloaded using the other kernel modules when a container (e.g., container 1 (170), container 2 (175), container 3 (180)) is rebooted. As a result, a container (e.g., container 1 (170), container 2 (175), container 3 (180)) reboot does not affect the uptime of other containers on the host (100). In addition, a container (e.g., container 1 (170), container 2 (175), container 3 (180)) reboot involves less overhead than an operating system reboot because the containers share a common operating system kernel. Consequently, a transport layer implementation (e.g., transport layer implementation 1 (150), transport layer implementation 2 (155), transport layer implementation 3 (160)) may be incorporated into a virtual network stack (e.g., virtual network stack 1 (162), virtual network stack 2 (164), virtual network stack 3 (166)) within a relatively short prior of time (e.g., seconds) after modifying the sock2path file.

In one or more embodiments of the invention, multiple transport layer implementations (e.g., transport layer implementation 1 (150), transport layer implementation 2 (155), transport layer implementation 3 (160)) may be tested simultaneously on multiple virtual network stacks (e.g., virtual network stack 1 (162), virtual network stack 2 (164), virtual network stack 3 (166)) on the host. Each transport layer implementation (e.g., transport layer implementation 1 (150), transport layer implementation 2 (155), transport layer implementation 3 (160)) may include a different variation in transport layer parameters from the others. For example, each transport layer implementation (e.g., transport layer implementation 1 (150), transport layer implementation 2 (155), transport layer implementation 3 (160)) may include a different congestion control algorithm, or a different congestion control response function for the same congestion control algorithm.

In one embodiment of the invention, once a given transport layer implementation is active (i.e., after the container associated with the virtual network stack is rebooted), test packets may then be sent to each virtual network stack (e.g., virtual network stack 1 (162), virtual network stack 2 (164), virtual network stack 3 (166)) and the corresponding TCP connection states recorded for each virtual network stack in response to receiving the test packets. Based on the different responses (based on, for example, the recorded TCP connection states) from the virtual network stacks (e.g., virtual network stack 1 (162), virtual network stack 2 (164), virtual network stack 3 (166)), a suitable transport layer implementation (e.g., transport layer implementation 1 (150), transport layer implementation 2 (155), transport layer implementation 3 (160)) with the optimal response may be selected for a production release or for use on other machines.

Figure 2:
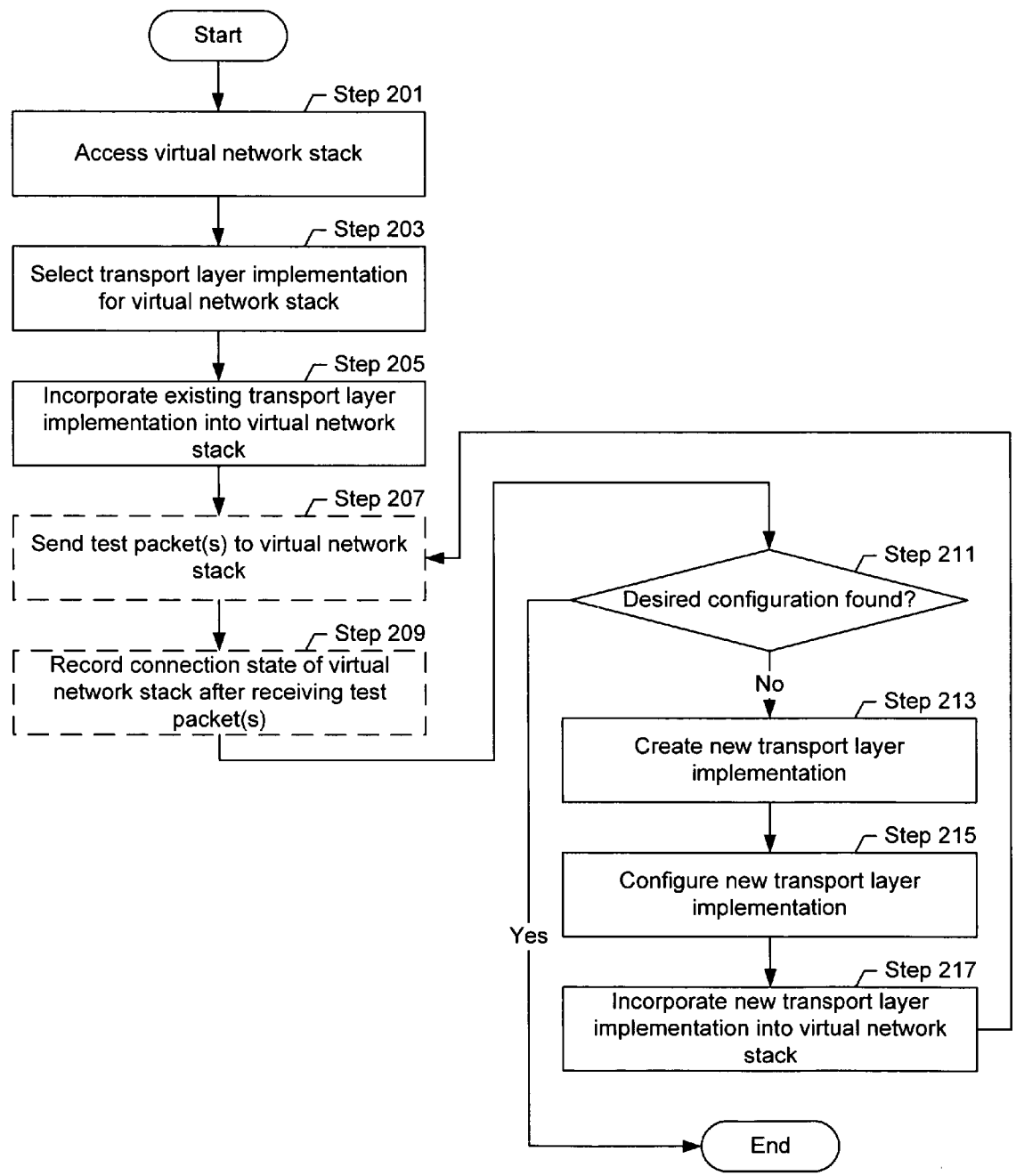
FIG. 2 shows a flow diagram in accordance with one or more embodiments of the invention.

FIG. 2 shows a flow diagram of a transport layer implementation selection in accordance with one or more embodiments of the invention. In one or more embodiments, one or more of the steps shown in FIG. 2 may be omitted, repeated, and/or performed in a different order. Further, multiple steps may be performed concurrently. Accordingly, the specific arrangement of steps shown in FIG. 2 should not be construed as limiting the scope of the invention.

Turning to FIG. 2, initially, a virtual network stack is accessed (Step 201). Accessing the virtual network stack may involve determining the address family, socket type, and/or protocol number associated with the virtual stack. In addition, the virtual network stack may be configured to record TCP connection states associated with test packets, as well as packet contents, allowing an administrator to determine if the selected transport layer implementation is behaving as expected or is performing better or worse than other transport layer implementations. If necessary, a new virtual network stack is created if no other virtual network stacks are available.

Next, an existing transport layer implementation is selected for the virtual network stack (Step 203). The existing transport layer implementation may include a transport protocol (e.g., TCP, UDP, Datagram Congestion Control Protocol (DCCP), Stream Control Transmission Protocol (SCTP), etc.), a congestion control algorithm (e.g., TCP Tahoe, TCP Reno, TCP Vegas, TCP New Reno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), Smart Acknowledgement (ACK) Dropper (SAD), etc.), congestion control parameters (e.g., tension, aggressiveness, timeout, switch congestion control on/off, etc.), and/or other tunables associated with the transport layer of a computer network. The transport layer implementation may be selected based on the type of network used, the services provided, network traffic patterns, the level of security desired, any combination thereof, etc.

Once a transport layer implementation is selected, the transport layer implementation is incorporated into the virtual network stack (Step 205). As stated above, this may involve editing a sock2path file using the soconfig command; the command adds a line listing the address family, socket type, and protocol number of the socket corresponding to the virtual network stack, as well as the device path of the transport layer implementation used for the virtual network stack. Any previous mapping involving the virtual network stack is overwritten with the current sock2path edit. As an alternative, the existing mapping may be removed by inputting the socket of the virtual network stack but not specifying the transport provider; once the existing mapping is removed, a new one is supplied. When the sock2path file is updated, the container linked to the virtual network stack is rebooted, and the transport layer implementation is integrated into the virtual network stack.

Those skilled in the art will appreciate that other methods of incorporating the transport layer implementation into the virtual network stack may be used. For example, each virtual network stack may be identified by a unique ID, such as a primary key in a relational database or the container ID of the container governing the virtual network stack. The virtual network stack may then be mapped to a particular transport layer implementation by editing a database entry containing the unique ID, editing a file containing the unique ID, or even passing a pointer or memory address corresponding to the transport layer implementation to the container or virtual network stack.

Once the virtual network stack includes the selected transport layer implementation, the transport layer implementation may, optionally, be tested. To do so, a test packet or packets may be sent to the virtual network stack (Step 207). The test packet(s) may be generated by another container on the host, or generated by another host on the network, and addressed to the virtual network stack. In one or more embodiments of the invention, a stream of test traffic used to test the transport layer implementation is created using the test packet(s). The virtual network then receives the test packet(s) and records a TCP connection state (Step 209) upon receipt of the packet(s). In one or more embodiments of the invention, the test traffic may be sent to the virtual network stack to determine how the virtual network stack handles congestion control, load balancing, etc.

After testing the virtual network stack, a determination is made as to whether the transport layer implementation includes the desired configuration (Step 211). The desired configuration may include an optimal congestion control algorithm, new or customized transport protocol version, patch, compatibility with other software, etc. If a desired configuration is found, no more testing or specifying of the transport layer implementation is required, and the configuration can be incorporated into a release or production solution. Alternatively, multiple transport layer implementations can be tested on multiple virtual network stacks simultaneously. The results of testing may then be compared and the most suitable transport layer implementation selected without repeatedly swapping out the transport layer implementation for one virtual network stack.

If a desired configuration is not found with the current transport layer implementation, a new transport layer implementation is created (Step 213) and configured (Step 215). Configuring a new transport layer implementation may involve writing custom code for the transport protocol and/or congestion control algorithm, setting parameters related to the transport protocol and/or congestion control algorithm, applying patches, and/or setting other tunables related to the transport layer. The new transport layer implementation is then incorporated into the virtual network stack (Step 217). As stated above, incorporating the new transport layer implementation into the virtual network stack may involve mapping the virtual network stack to the transport layer implementation, then rebooting the container associated with the virtual network stack. Once the new transport layer implementation is incorporated into the virtual network stack, the transport layer implementation may be tested (Step 207-209) and the process repeated until a desirable transport layer configuration is found.

Figure 3:
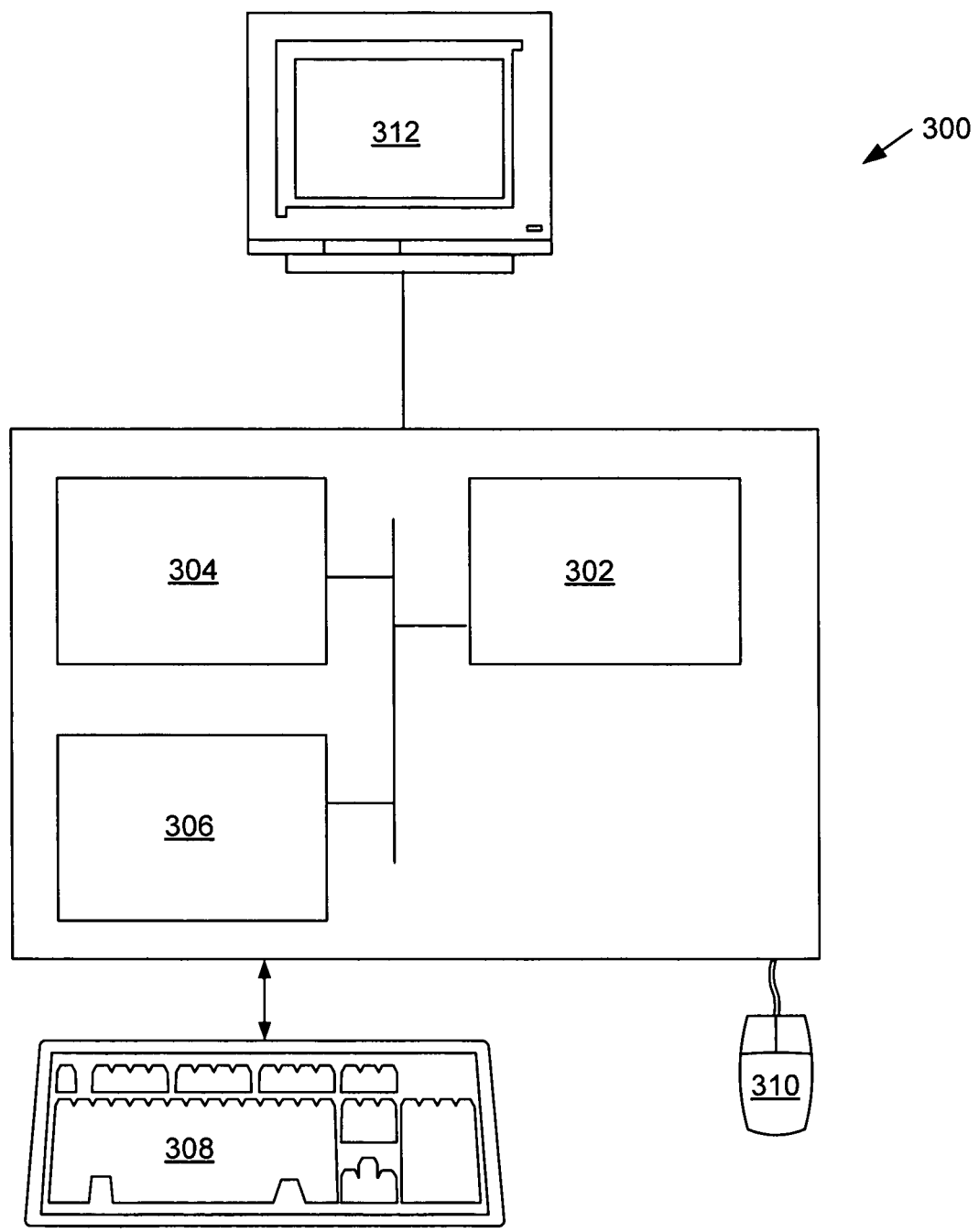
FIG. 3 shows a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., virtual network stack, virtual NIC, NIC, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a network on a host, comprising:
   obtaining a first virtual network stack associated with a first container and a second virtual network stack associated with a second container, wherein the first virtual network stack, the second virtual network stack, the first container, and the second container are on the host, wherein the first container comprises a first isolated execution environment executing on at least one processor of the host, and wherein the second container comprises a second isolated execution environment executing on the at least one processor;
   receiving an address family, a socket type, and a protocol number;
   selecting a first transport layer implementation for the first virtual network stack using the address family, the socket type, and the protocol number;
   configuring the first virtual network stack using the first transport layer implementation;
   selecting a second transport layer implementation on the second virtual network stack;
   configuring the second virtual network stack using the second transport layer implementation;
   rebooting the first container, wherein rebooting the first container does not impact the second container;
   receiving a packet by a network interface card (NIC) operatively connected to the host;
   determining, by a classifier on the NIC, that the packet is associated with the first container;
   sending a packet to the first virtual network stack;
   processing the packet using the first transport layer implementation; and
   sending the processed packet to the first container.

2. The method of claim 1, further comprising:
   sending a test packet to the first virtual network stack; and
   recording a connection state of the first virtual network stack upon receiving the test packet by the first virtual network stack.

3. The method of claim 1, wherein the first transport layer implementation comprises a first transport protocol, and wherein the second transport layer implementation comprises a second transport protocol.

4. The method of claim 1, wherein the first transport layer implementation comprises a first congestion control algorithm, and wherein the second transport layer implementation comprises a second congestion control algorithm.

5. A system for configuring a network on a host, comprising:
   a network interface card (NIC), operatively connected to the host, comprising a classifier configured to determine the destination container of an incoming packet; and
   the host, comprising:
      at least one processor;

a memory;
a first virtual network stack associated with a first container, wherein the first container comprises a first isolated execution environment executing on the at least one processor;
a second virtual network stack associated with a second container, wherein the second container comprises a second isolated execution environment executing on the at least one processor; and
wherein the at least one processor is configured to execute instructions stored on the memory, enabling the system to:
obtain the first virtual network stack and the second virtual network stack;
receive an address family, a socket type, and a protocol number;
select a first transport layer implementation for the first virtual network stack using the address family, the socket type, and the protocol number;
configure the first virtual network stack using the first transport layer implementation;
select a second transport layer implementation on the second virtual network stack;
configure the second virtual network stack using the second transport layer implementation;
receive, from the NIC, a packet associated with the first container;
send the packet to the first virtual network stack;
process the packet using the first transport layer implementation; and
sending the processed packet to the first container.

6. The system of claim 5, wherein the host is further configured to:
send a test packet to the first virtual network stack; and
record a connection state of the first virtual network stack upon receiving the test packet by the first virtual network stack.

7. The system of claim 5, wherein the first transport layer implementation comprises a first transport protocol, and wherein the second transport layer implementation comprises a second transport protocol.

8. The system of claim 5, wherein the first transport layer implementation comprises a first congestion control algorithm, and wherein the second transport layer implementation comprises a second congestion control algorithm.

9. A non-transitory computer usable medium having computer readable program code embodied therein for causing a computer system to execute a method for configuring a network on a host, the method comprising:
obtaining a first virtual network stack associated with a first container and a second virtual network stack associated with a second container, wherein the first virtual network stack, the second virtual network stack, the first container, and the second container are on the host, wherein the first container comprises a first isolated execution environment executing on at least one processor of the host, and wherein the second container comprises a second isolated execution environment executing on the at least one processor;
receiving an address family, a socket type, and a protocol number;
selecting a first transport layer implementation for the first virtual network stack using the address family, the socket type, and the protocol number;
configuring the first virtual network stack using the first transport layer implementation;
selecting a second transport layer implementation on the second virtual network stack;
configuring the second virtual network stack using the second transport layer implementation;
receiving a packet by a network interface card (NIC) operatively connected to the host;
determining, by a classifier on the NIC, that the packet is associated with the first container;
sending a packet to the first virtual network stack;
processing the packet using the first transport layer implementation; and
sending the processed packet to the first container.

10. The non-transitory computer usable medium of claim 9, the method further comprising:
sending a test packet to the first virtual network stack; and
recording a connection state of the first virtual network stack upon receiving the test packet by the first virtual network stack.

11. The non-transitory computer usable medium of claim 9, wherein the first transport layer implementation comprises a first transport protocol, and wherein the second transport layer implementation comprises a second transport protocol.

* * * * *